(12) United States Patent
Fouda et al.

(10) Patent No.: US 12,203,360 B2
(45) Date of Patent: Jan. 21, 2025

(54) MAXIMIZING INFORMATION GAIN FROM PIPE INSPECTION INVERSION

(71) Applicant: Halliburton Energy Services, Inc., Houston, TX (US)

(72) Inventors: Ahmed Fouda, Houston, TX (US); Christopher Michael Jones, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 144 days.

(21) Appl. No.: 18/081,917

(22) Filed: Dec. 15, 2022

(65) Prior Publication Data

US 2024/0200440 A1 Jun. 20, 2024

(51) Int. Cl.
*G01V 3/38* (2006.01)
*E21B 47/08* (2012.01)
*G01V 3/28* (2006.01)

(52) U.S. Cl.
CPC ........... *E21B 47/08* (2013.01); *G01V 3/28* (2013.01); *G01V 3/38* (2013.01)

(58) Field of Classification Search
CPC .... E21B 47/006; E21B 47/092; E21B 47/085; E21B 47/00; E21B 17/028; E21B 47/09; E21B 47/007; E21B 47/12; E21B 12/02; E21B 17/08; G01B 7/10; G01B 7/06; G01B 7/02; G01B 7/105; G01B 7/13; G01B 15/02; G01B 2210/46; G01B 7/28; G01B 7/281; G01B 11/06; G01B 11/30; G01B 17/02; G01B 21/08; G01V 3/28; G01V 3/18; G01V 3/34; G01V 5/045;

(Continued)

(56) References Cited

U.S. PATENT DOCUMENTS

| 6,826,486 B1 | 11/2004 | Malinverno |
| 9,720,130 B2 | 8/2017 | Djikpesse et al. |
| 10,094,213 B1 * | 10/2018 | Guijt .................. E21B 47/00 |

(Continued)

OTHER PUBLICATIONS

Vasic et al., Stochastic Inversion Approach to Measurement of Tube Properties Using Remote Field Technique, 2011 IEEE International Instrumentation and Measurement Technology Conference, 2011.

*Primary Examiner* — Vinh P Nguyen
(74) *Attorney, Agent, or Firm* — John Wustenberg; C. Tumey Law Group PLLC

(57) ABSTRACT

A method for estimating a thickness for each of a plurality of nested tubulars may include disposing an electromagnetic (EM) logging tool in a wellbore, transmitting an electromagnetic field from the transmitter into one or more tubulars to energize the one or more tubulars with the electromagnetic field thereby producing an eddy current, and measuring the electromagnetic field generated by the eddy current. Additionally, the method may include defining a prior distribution of at least one pipe thickness log based on the plurality of measurements, processing a first set of measurement depth points to estimate one or more tubulars at one or more depths in the wellbore, computing a posterior distribution of the thickness log based at least in part on the prior distribution and the one or more thicknesses, and determining a second set of measurement depth points to process based on the posterior distribution.

20 Claims, 14 Drawing Sheets

(58) Field of Classification Search
CPC . G01V 1/40; G01V 3/081; G01V 1/50; G01V 3/10; G01N 27/9006; G01N 21/956
See application file for complete search history.

(56) References Cited

U.S. PATENT DOCUMENTS

| | | | |
|---|---|---|---|
| 10,422,913 | B2 | 9/2019 | Fouda et al. |
| 11,181,659 | B2 * | 11/2021 | Fouda ................. G01V 3/28 |
| 11,500,119 | B2 * | 11/2022 | Fouda ................. E21B 47/006 |
| 11,520,072 | B2 * | 12/2022 | Fouda ................. G01B 7/13 |
| 11,566,511 | B2 * | 1/2023 | Seah ................. G01V 3/18 |
| 2018/0172872 | A1 | 6/2018 | Fouda et al. |
| 2019/0078430 | A1 | 3/2019 | Fouda et al. |
| 2020/0081148 | A1 | 3/2020 | Capoglu et al. |
| 2020/0182830 | A1 | 6/2020 | Fouda et al. |
| 2020/0190969 | A1 | 6/2020 | Ren et al. |
| 2020/0200940 | A1 | 6/2020 | Fouda et al. |
| 2020/0271818 | A1 | 8/2020 | Fouda et al. |
| 2020/0309986 | A1 | 10/2020 | Donderici et al. |
| 2020/0333500 | A1 | 10/2020 | Fouda et al. |
| 2020/0378240 | A1 | 12/2020 | Fouda et al. |
| 2021/0054731 | A1 | 2/2021 | Fouda et al. |
| 2021/0239874 | A1 | 8/2021 | Fouda |
| 2022/0065094 | A1 | 3/2022 | Hill, III et al. |
| 2022/0390641 | A1 | 12/2022 | Dai et al. |

\* cited by examiner

MAXIMIZING INFORMATION GAIN FROM PIPE INSPECTION INVERSION

BACKGROUND

For oil and gas exploration and production, a network of wells, installations and other conduits may be established by connecting sections of metal pipe together. For example, a well installation may be completed, in part, by lowering multiple sections of metal pipe (e.g., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators.

Early detection of metal loss is of great importance to oil and gas wells management. Failure to detect metal loss due to corrosion may result in expensive remedial measures and intervention in production wells. In some cases, the leaks due to severe corrosion may contaminate ground water or cause environmental damage. Electromagnetic (EM) techniques are commonly used to monitor the condition of the production and intermediate casing strings.

EM techniques may utilize multi-channel measurements to determine the thickness of each tubular using inversion. Computing the thickness of each tubular using the measured logs is an inverse problem. Solving the inversion problem comprises searching for pipe properties that minimize the misfit between the measurements at a given depth point and synthetic responses computed using a computer model.

Inversion is an iterative process that requires running the forward model multiple times with different model parameters until convergence is reached between measured and synthetic responses. The inversion process is repeated for each depth point in the log, which makes it a time-consuming process that could easily take several hours to process a 100 ft of data even when using parallel computing. Upon inspection of the inversion results, the analyst may need to adjust one of the inversion parameters and restart the whole process. This makes the process less suited for time-sensitive jobs such as those involving workover rigs.

BRIEF DESCRIPTION OF THE DRAWINGS

These drawings illustrate certain aspects of some examples of the present disclosure and should not be used to limit or define the disclosure.

DETAILED DESCRIPTION

Figure 1:
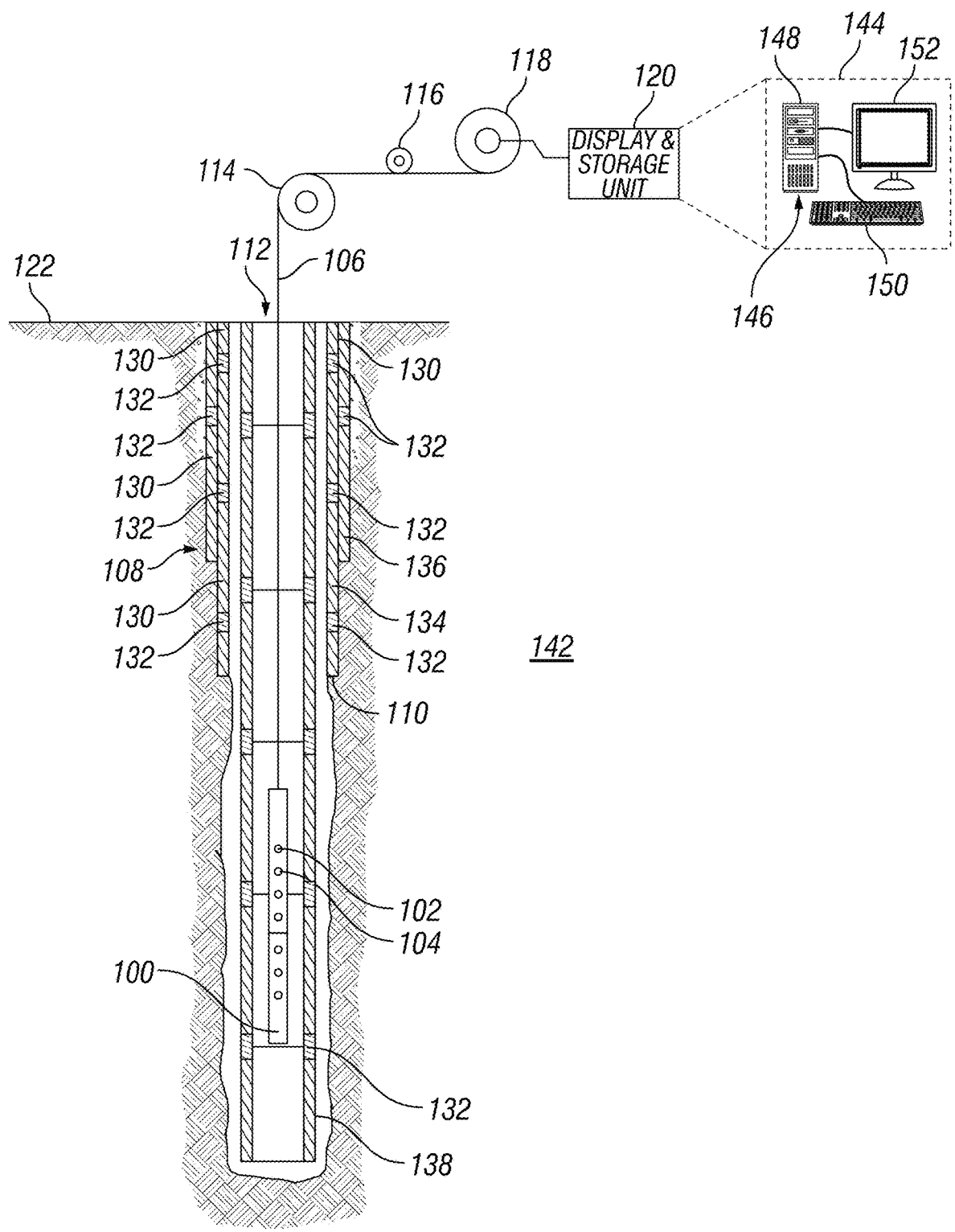
FIG. 1 illustrates an example of an EM logging tool disposed in a wellbore.

This disclosure may generally relate to pipe inspection in subterranean wells and, more particularly, to methods and systems for identifying corrosion in one or more tubulars of a plurality of nested tubulars. Measurements taken by an electromagnetic (EM) logging tool may form one or more measurement logs. The measurement logs may be processed by utilizing a Bayes' theorem and combines the information from a prior distribution and a likelihood function to estimate one or more thicknesses of one or more tubulars at one or more depths in wellbore. In this application a method is proposed for sorting the logging points to run inversion in descending order of expected information gain from each point. Sorted points may be grouped in batches and processed in parallel. The inversion results from each batch are used to construct intermediate individual thickness curves that are displayed to personnel along with the level of uncertainty. The analyst may make a decision to adjust inversion parameters based on the intermediate results. The level of uncertainty may provide a termination criterion. The method is based on Bayesian framework wherein information from raw data logs is used to construct prior distributions of the individual thickness curves for pipe thickness logs based on a plurality of measurements taken by EM logging tool 100 (e.g., referring to FIG. 1). The prior distribution captures the correlation among different depth points through a covariance matrix. After each inversion (or inversion batch), the posterior distribution is computed, and the covariance matrix of the posterior distribution is updated. The following batch of inversion depths is determined based on the updated covariance matrix such that the expected information gain from that batch is maximized.

Electromagnetic (EM) sensing may provide continuous in-situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more).

EM logging tools may measure eddy currents to determine metal loss and use magnetic cores with one or more coils to detect defects in multiple concentric pipes. The EM logging tools may use pulse eddy current (time-domain) and may employ multiple (long, short, and transversal) coils to evaluate multiple types of defects in multiple concentric pipes. It should be noted that the techniques utilized in time-domain may be utilized in frequency-domain measurements. In examples, EM logging tools may operate on a conveyance. Additionally, EM logging tools may include an independent power supply and may store the acquired data on memory.

Monitoring the condition of the production and intermediate casing strings is crucial in oil and gas field operations. EM eddy current (EC) techniques have been successfully used in inspection of these components. EM EC techniques include two broad categories: frequency-domain EC techniques and time-domain EC techniques. In both techniques, one or more transmitters are excited with an excitation signal, and the signals from the pipes are received and recorded for interpretation. The magnitude of a received signal is typically inversely proportional to the amount of metal that is present in the inspection location. For example, less signal magnitude is typically an indication of more metal, and more signal magnitude is an indication of less metal. This relationship may allow for measurements of metal loss, which typically is due to an anomaly related to the pipe such as corrosion or buckling.

FIG. 1 illustrates an operating environment for an EM logging tool 100 as disclosed herein in accordance with some embodiments. EM logging tool 100 may comprise a transmitter 102 and/or a receiver 104. In examples, transmitters 102 and receivers 104 may be coil antennas. Furthermore, transmitter 102 and receiver 104 may be separated by a space between about 0.1 inches (0.254 cm) to about 200 inches (508 cm). In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104 or vice versa. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110.

Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100 in casing string 108.

A typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. Such as, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

EM logging tool 100 may include a digital telemetry system which may further include one or more electrical circuits, not illustrated, to supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within EM logging tool 100 and data provided by EM logging tool 100 may be stored within EM logging tool 100, rather than transmitted to the surface to display and storage unit 120 during logging operations. The data may include signals and measurements related to corrosion detection.

During operations, transmitter 102 may broadcast electromagnetic fields into subterranean formation 142. It should be noted that broadcasting electromagnetic fields may also be referred to as transmitting electromagnetic fields. The electromagnetic fields transmitted from transmitter 102 may be referred to as primary electromagnetic fields. The primary electromagnetic fields may produce Eddy currents in casing string 108 and pipe string 138. These Eddy currents, in turn, produce secondary electromagnetic fields that may be sensed and/or measured by receivers 104. Characterization of casing string 108 and pipe string 138, including determination of pipe attributes, may be performed by measuring and processing primary and secondary electromagnetic fields. Pipe attributes may include, but are not limited to, pipe thickness, pipe conductivity, and/or pipe permeability.

As illustrated, receivers 104 may be positioned on EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown in FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by transmitter 102 and the sensing and/or measuring of secondary electromagnetic fields by receivers 104 may be controlled by display and storage unit 120, which may include an information handling system 144. As illustrated, the information handling system 144 may be a component of or be referred to as the display and storage unit 120, or vice-versa. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). Non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due to the transition of the pulse from "off" to "on" state or from "on" to "off" state (more common). These transient electromagnetic fields produce EC in the concentric pipes (e.g., casing string 108 and pipe string 138). The EC, in turn, produces secondary electromagnetic fields that may be sensed and/or measured by receivers 104 placed at some distance on EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times for first casing 134, for second casing 136, and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. In examples, a remote-field eddy current (RFEC) effect may be observed. In an RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}t \tag{1}$$

and the magnitude of the impedance shows the dependence:

$$\exp\left[-2\left(\sqrt{\frac{\omega\mu\sigma}{2}}\right)t\right] \tag{2}$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \quad (3)$$

The phase of the impedance varies as:

$$\varphi \cong 2\frac{t}{\delta} \quad (4)$$

and the magnitude of the impedance shows the dependence:

$$\exp\left[\frac{-2t}{\delta}\right] \quad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
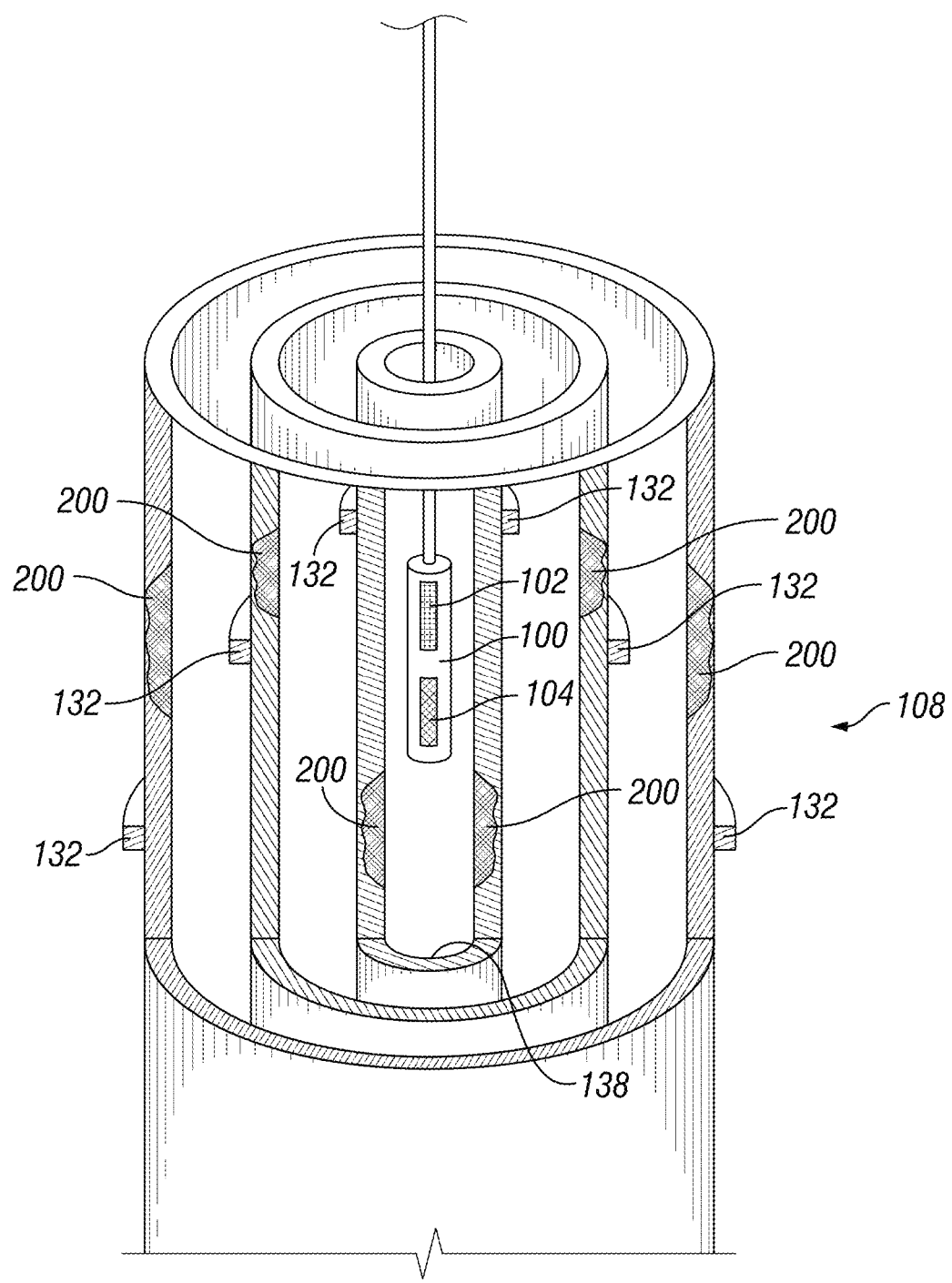
FIG. 2 illustrates an example of arbitrary defects within multiple pipes.
Figure 3A:
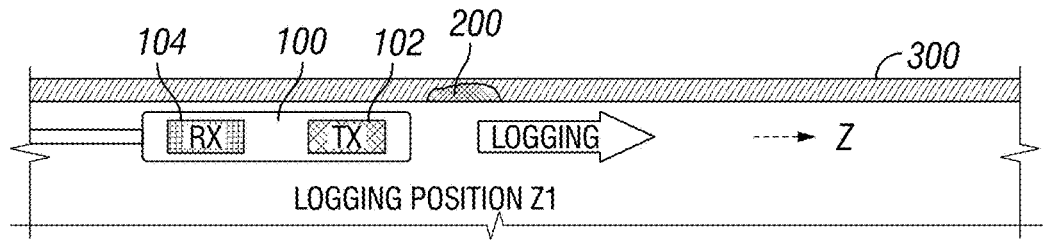
FIGS. 3A-3E illustrate examples of an EM logging tool traversing a wellbore.
Figure 3B:
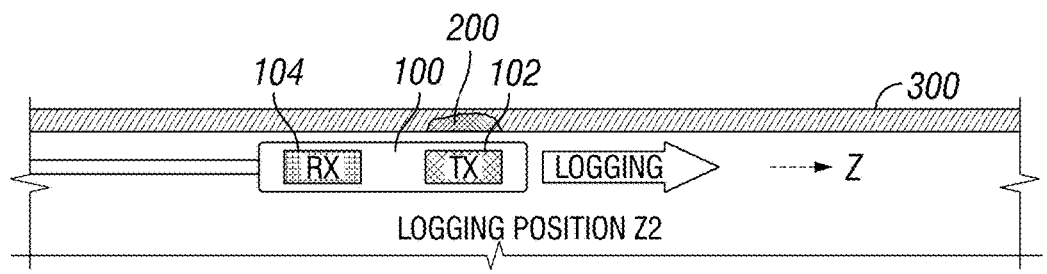
Figure 3C:
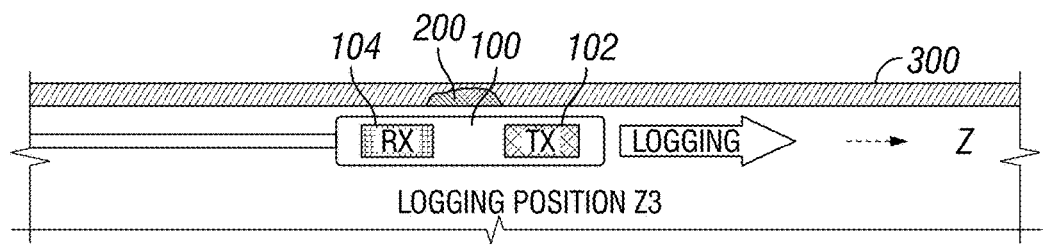
Figure 3D:
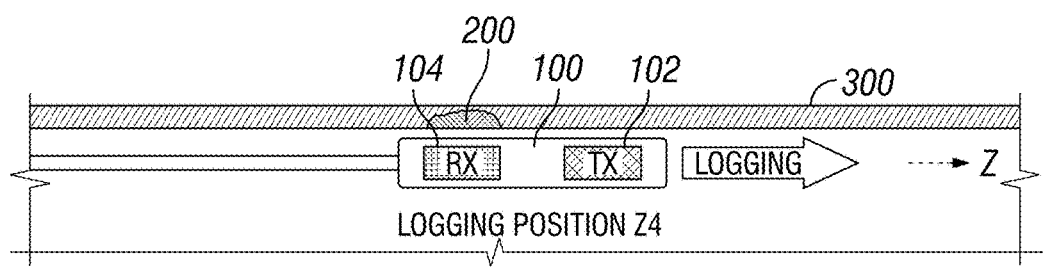
Figure 3E:
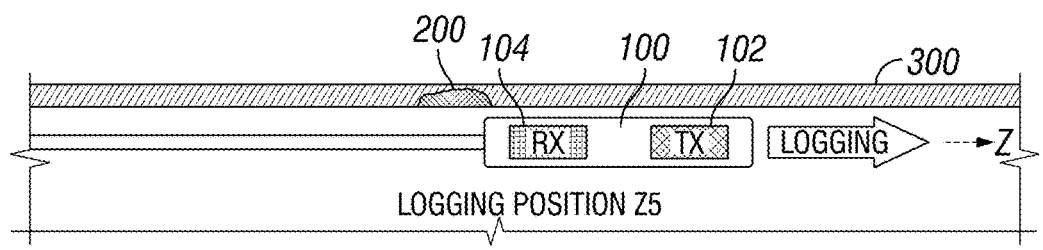

FIG. 2 shows EM logging tool 100 disposed in pipe string 138 which may be surrounded by a plurality of nested pipes (e.g., first casing 134 and second casing 136) and an illustration of anomalies 200 disposed within the plurality of nested pipes, in accordance with some embodiments. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing, and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. It should be noted that inversion methods may include model-based inversion which may include forward modeling. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet (1.8 meters)). Due to these complications, methods may need to be used to accurately inspect pipe features.

FIGS. 3A-3E illustrate an electromagnetic inspection and detection of anomalies 200 (e.g., defects) or collars 132 (e.g., Referring to FIG. 2), in accordance with some embodiments. As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly, by inspecting the signal loss, it may be possible to identify metal gain such as due to presence of a casing collar 132 (e.g., Referring to FIG. 1) where two pipes meet with a threaded connection. In order to distinguish signals from different pipes in a multiple concentric pipe configuration, multiple transmitter-receiver spacing, and frequencies may be used. For example, short spaced transmitters 102 and receivers 104 may be sensitive to pipe string 138, while long spaced transmitters 102 and receivers 104 may be sensitive to deeper pipes (e.g., first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132 and/or anomalies 200 (e.g., defects).

For example, due to eddy current physics and electromagnetic attenuation, pipes disposed in pipe string 138 (e.g., referring to FIG. 1 and FIG. 2) may generate an electrical signal that may be in the opposite polarity to the incident signal and results in a reduction in the received signal. Generally, as metal volume increases the signal loss may increase. As a result, by inspecting the signal gains, it may be possible to identify zones with metal loss (such as corrosion). In order to distinguish signals that originate from anomalies 200 (e.g., defects) at different pipes of a multiple nested pipe configuration, multiple transmitter-receiver spacing, and frequencies may be used. For example, short spaced transmitters 102 and receivers 104 may be sensitive to first pipe string 138 (e.g., referring to FIG. 2), while long spaced transmitters 102 and receivers 104 may be sensitive to deeper ($2^{nd}$, $3^{rd}$ etc.) pipes (e.g., first casing 134 and second casing 136).

Analyzing the signal levels at different channels with an inversion scheme, it may be possible to relate a certain received signal to a certain metal loss or gain at each pipe. In addition to loss of metal, other pipe properties such as magnetic permeability and electrical conductivity may also be estimated by inversion. There may be several factors that complicate interpretation of losses: (1) deep pipe signals may be significantly lower than other signals; (2) double dip indications appear for long spaced transmitters 102 and receivers 104; (3) spatial spread of long spaced transmitter-receiver signal for a collar 132 may be long (up to 6 feet); (4) to accurately estimate of individual pipe thickness, the material properties of the pipes (such as magnetic permeability and electrical conductivity) may need to be known with fair accuracy; (5) inversion may be a non-unique process, which means that multiple solutions to the same problem may be obtained and a solution which may be most physically reasonable may be chosen. Due to these complications, an advanced algorithm or workflow may be used to accurately inspect pipe features, for example when more than two pipes may be present in pipe string 138.

During logging operations as EM logging tool 100 traverses across pipe 300 (e.g., referring to FIG. 3), an EM log of the received signals may be produced and analyzed. The EM log may be calibrated prior to running inversion to account for the deviations between measurement and simulation (forward model). The deviations may arise from several factors, including the nonlinear behavior of the magnetic core, magnetization of pipes, mandrel effect, and inaccurate well plans. Multiplicative coefficients and constant factors may be applied, either together or individually, to the measured EM log for this calibration.

Figure 4:
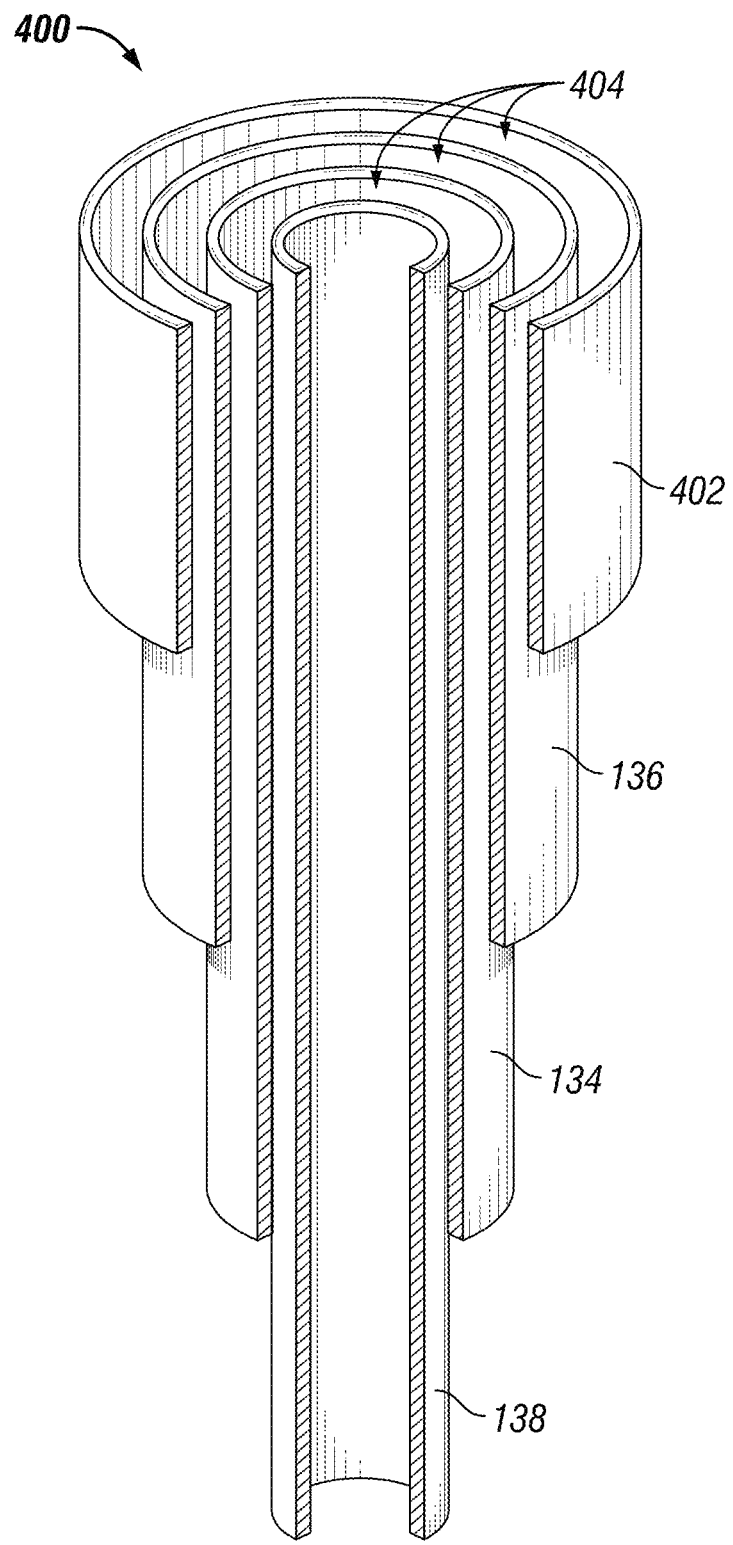
FIG. 4 illustrates an example of a well plan.

FIG. 4 illustrates an example of a well plan 400 in accordance with some embodiments. Depending on the design of well plan 400, well construction may have between two and four main components. These components include conductor, surface, intermediate and production casings. After completion of the well, tubing may be inserted to pump hydrocarbon products. In this example, well plan 400 may comprise pipe string 138, first casing 134, second casing 136, a conductor casing 402, and wherein cement may be disposed in annulus 404 between each casing. However, it should be noted that well plan 400 may include any number of pipes, casings, tubulars, and/or the like. Well plan 400 is not limited or bound by the four pipes that are displayed in FIG. 4. When EM logging tool 100 is used to monitor the pipe condition a log may be produced.

Monitoring the condition of the casing strings is crucial in oil and gas field operations. As discussed above, EM techniques may be used to inspect pipes, casings, tubulars, and/or the like. Generally, an eddy current (EC) technique is a common EM technique that is utilized for monitoring the condition of casing strings. In EC, when the transmitter coil emits the primary transient EM fields, eddy current is induced in the surrounding casings. The eddy currents then produce secondary fields, which may be received along with the primary fields by one or more receivers 104. EM logging tool 100 may utilize two or more transmitters 102 and may utilize two or more receivers 104, operating at multi-frequencies. By using the multi-channel measurements, the thickness of pipe string 138, first casing 124, second casing 136, etc. (e.g., referring to FIGS. 1 and 4) may be obtained through inversion.

Computing the thickness of pipe string 138, first casing 124, second casing 136, etc. through one or more measurement logs created from one or more measurement operations is an inverse problem. The inversion problem searches for pipe properties that minimize the misfit between the measurements at a given depth point and synthetic responses computed using a physical model. Since the inverse problem is ill-posed, in the absence of other information, more than one solution may fit the measurements. As a result of that, the inversion result may show non-physical choppiness in the estimated thickness of individual tubulars (i.e., of pipe string 138, first casing 124, second casing 136, etc.). A regularization term may be added to the cost function to constrain the solution.

The Bayesian approach is applied to process the data from one or more measurement logs taken during one or more measurement operations. Statistically, Bayesian theorem describes the probability of an event given some prior knowledge related to this event and its condition. More specifically, the Bayes rule derives the posterior probability of a quantity of interest given observed data related to that quantity, and a prior distribution of the quantity of interest. In particular, for the multi-pipe inversion application, the quantity of interest is the thickness of each tubular (i.e., of pipe string 138, first casing 124, second casing 136, etc.) at different depth points. For one given tubular, this may be denoted by a vector, seen below:

$$t = [t_1, t_2, \ldots, t_N] \quad (6)$$

at N depth points. The prior distribution of t may be assumed as a multivariate normal distribution with mean $\bar{t}$ and covariance matrix $\Sigma$. p(t) may be written as:

$$p(t) = \frac{1}{\sqrt{(2\pi)^N |\Sigma|}} \exp\left(-\frac{1}{2}(t-\bar{t})^T \Sigma^{-1} (t-\bar{t})\right) \quad (7)$$

The likelihood function of observing an inverted thickness $t\_inv_{i,obs}$ at the $i^{th}$ depth given a pipe thickness t is given by:

$$p(t\_inv_i = t\_inv_{i,obs} | t) = \frac{1}{\sqrt{2\pi}\sigma_i} \exp\left(\frac{-(t\_inv_{i,obs} - t)^2}{2\sigma_i^2}\right) \quad (8)$$

where $\sigma_i$ is the precision (standard deviation) of the inversion. The above Equations (7) & (8) assumes that for a given thickness vector, the inversion at one point is independent of the thicknesses at other points, which is conditional independence of the likelihood function. This is the same assumption used in radial 1-dimensional inversion of tubular inspection data. The likelihood function is utilized to estimate one or more thicknesses of one or more tubulars at one or more depths in wellbore 110 (e.g., referring to FIG. 1).

Applying Bayes' rule, the posterior distribution of the thickness having inverted a batch of K measurement points $t\_inv_{obs}$ is given by $$p(t | \text{t\_inv} = \text{t\_inv}_{obs}) = \frac{p(t) \prod_{i=1}^{K} p(\text{t\_inv}_i = \text{t\_inv}_{i,obs} | t)}{p(\text{t\_inv})} \quad (9)$$

p(t_inv) is the probability distribution of the inverted thicknesses t_inv, which may be computed as $$p(\text{t\_inv})) = \int_t p(\text{t\_inv} | t) p(t) dt \quad (10)$$

This probability remains constant for all possible models being considered. The factor is the same for all hypotheses. Therefore, the posterior probability is proportional to the product of the likelihood function and the model prior as follows:

$$p(t | \text{t\_inv} = \text{t\_inv}_{obs}) \propto p(t) \prod_{i=1}^{K} p(\text{t\_inv} = \text{t\_inv}_{i,obs} | t) \quad (11)$$

The model parameters estimate that maximizes the posterior probability distribution is known as the maximum a posteriori estimate (MAP) and is given as $$\hat{t} = \text{argmax}_t \{ p(t | \text{t\_inv} = \text{t\_inv}_{obs}) \} \quad (12)$$

which may be computed in a closed form for normal distributions with observations being a linear function of the model parameters as the ones given in Equations (7) & (8). For more general nonlinear observations, statistical methods, such as Markov chain Monte Carlo may be used to compute the MAP estimate.

The next measurement point may be determined from the posterior distribution as the depth point that is associated with the highest thickness uncertainty, or equivalently the lowest marginal posterior PDF of $$t_i = \hat{t}_i \quad (13)$$

$$i_{opt} = \text{argmin}_i \{ p(t_i = \hat{t}_i | \text{t\_inv} = \text{t\_inv}_{obs}) \} \quad (14)$$

This also corresponds to the depth point that is associated with the highest diagonal element of the posterior covariance matrix.

Figure 5:
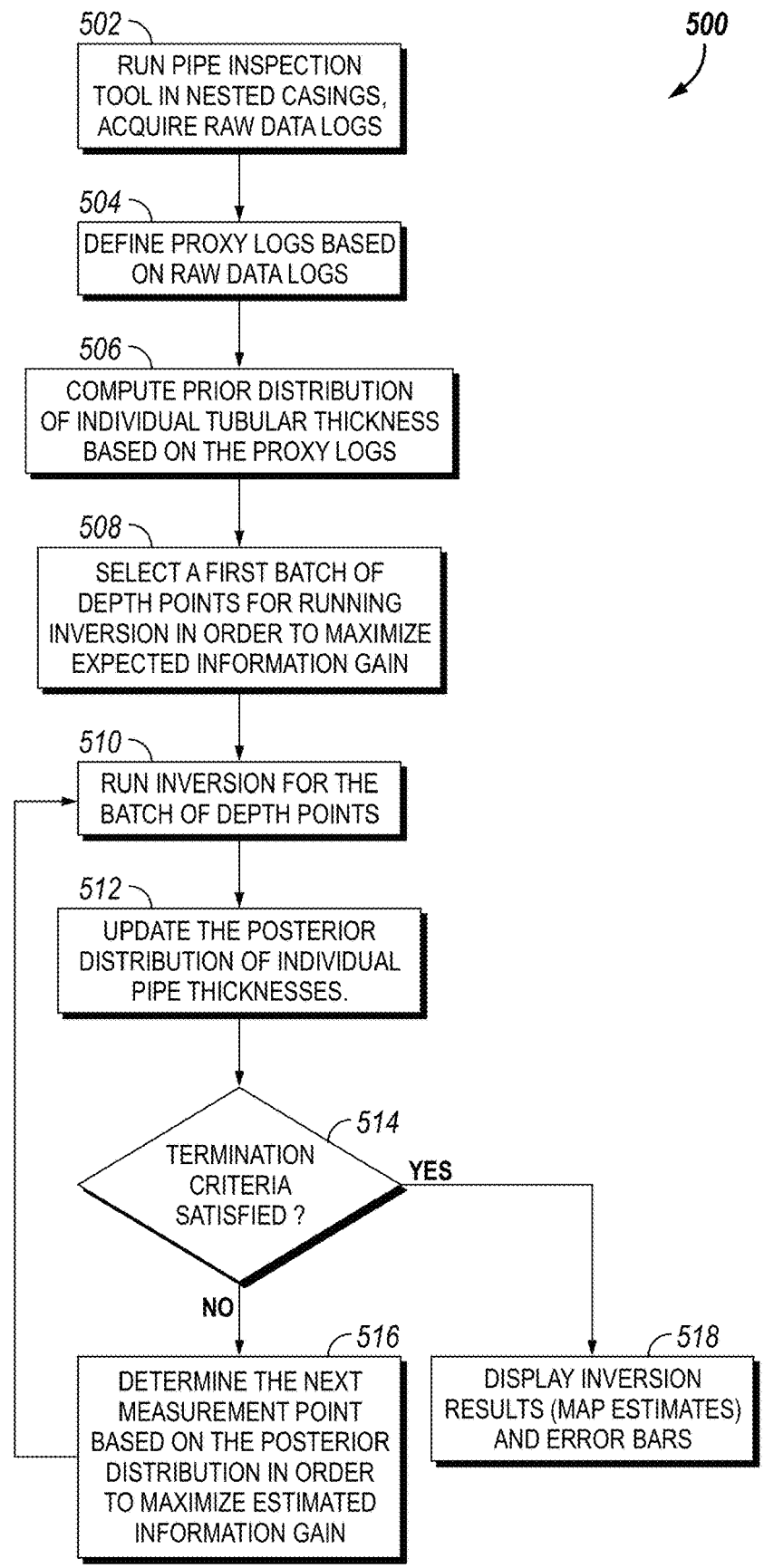
FIG. 5 illustrates a workflow for measuring tubular thicknesses.

FIG. 5 illustrates workflow 500 for measuring tubular thicknesses. It should be noted that at least a part of workflow 500 may be performed on information handling system 144 (e.g., referring to FIG. 1). Workflow 500 may begin with block 502 in which EM logging tool 100 is disposed into wellbore 110 (e.g., referring to FIG. 1) to take a plurality of measurements at a plurality of depths in a measurement operation of wellbore 110. Specifically, measurements may be taken of one or more tubulars (i.e., of pipe string 138, first casing 124, second casing 136, etc.) identified in well plan 400 (e.g., referring to FIG. 4) may be in the time domain or the frequency domain. Measurements taken by EM logging tool 100 may be communicated to information handling system 144, which may process the measurements into a raw data logs. The raw data logs may show the measurements taken at any of the plurality of depths of wellbore 110.

In block 504, the raw data logs may be utilized to define proxy logs. Proxy logs are representatives of the individual thickness of each tubular. They may be obtained by linearly scaling certain channels from the raw data logs. For example, raw data with progressively increasing transmitter-receiver spacing may be scaled and used as proxies for tubulars with increasing diameters. Alternatively, a non-linear inversion using a fast forward model may be used to generate first estimates of the individual thicknesses of each tubular that may be used as proxy logs for the final individual thicknesses of each tubular (as a prior distribution) to be estimated using a more accurate forward model.

Using proxy logs from block 506, a prior distribution of individual tubulars thickness may be computed in block 504. For each tubular, the prior distribution of at least one pipe thickness log captures the correlation among different depth points through a covariance matrix, using the methods described above. Using the covariance matrix, a first batch of measurement points may be selected for an inversion.

In block 508, a first batch of K depth points are selected for which an inversion may be performed. Starting with one arbitrary depth points, the next K−1 depth points are selected sequentially one at a time in descending order, of the proxy logs found in block 504, of expected information gain from each point. Information gain may be determined utilizing Equation (11) above to identify differential entropy. The change in differential entropy is the information gain found in block 508, which may but utilized further in block 510.

In block 510, an inversion is run on the batch of K points from block 508. The inversion may be run in parallel on multiple workers. The inversion may produce a thickness for each tubular that measurements are being processed. In block 510, Bayes' rule, discussed above, is applied to compute the posterior distribution for the measurements from the prior distribution and the likelihood function of the measurements from block 508 of the thickness logs to estimate one or more thicknesses of one or more tubulars at one or more depths in wellbore 110 (e.g., referring to FIG. 1).

Using the posterior distribution, a termination criterion is applied to the results from block 512 to determine if the criterion is met in block 514. Termination criteria may be based on the level of uncertainty to be tolerated and/or the differential information gain from the previous acquisition. In block 516, if the termination criteria is not met, determine the next batch of inversion depth points such that the expected information gain from sequential points is maximized. For example, a candidate depth point may be chosen as a depth point that has the highest variance in the posterior distribution, the candidate depth point that has the highest projection of the first principal component of the posterior covariance matrix, the candidate depth point that results in the largest decrease in the differential entropy of the expected posterior distribution after inverting the data at that depth point, or the candidate depth point that results in the largest decrease in the determinant of the expected covariance matrix after inverting the data at that candidate depth point. Then, repeat blocks 510-514 until a termination criterion is met. Once a termination criterion is met, in block 518 a maximum a posteriori estimates of the individual tubular thicknesses along with the confidence intervals may be displayed.

Figure 6:
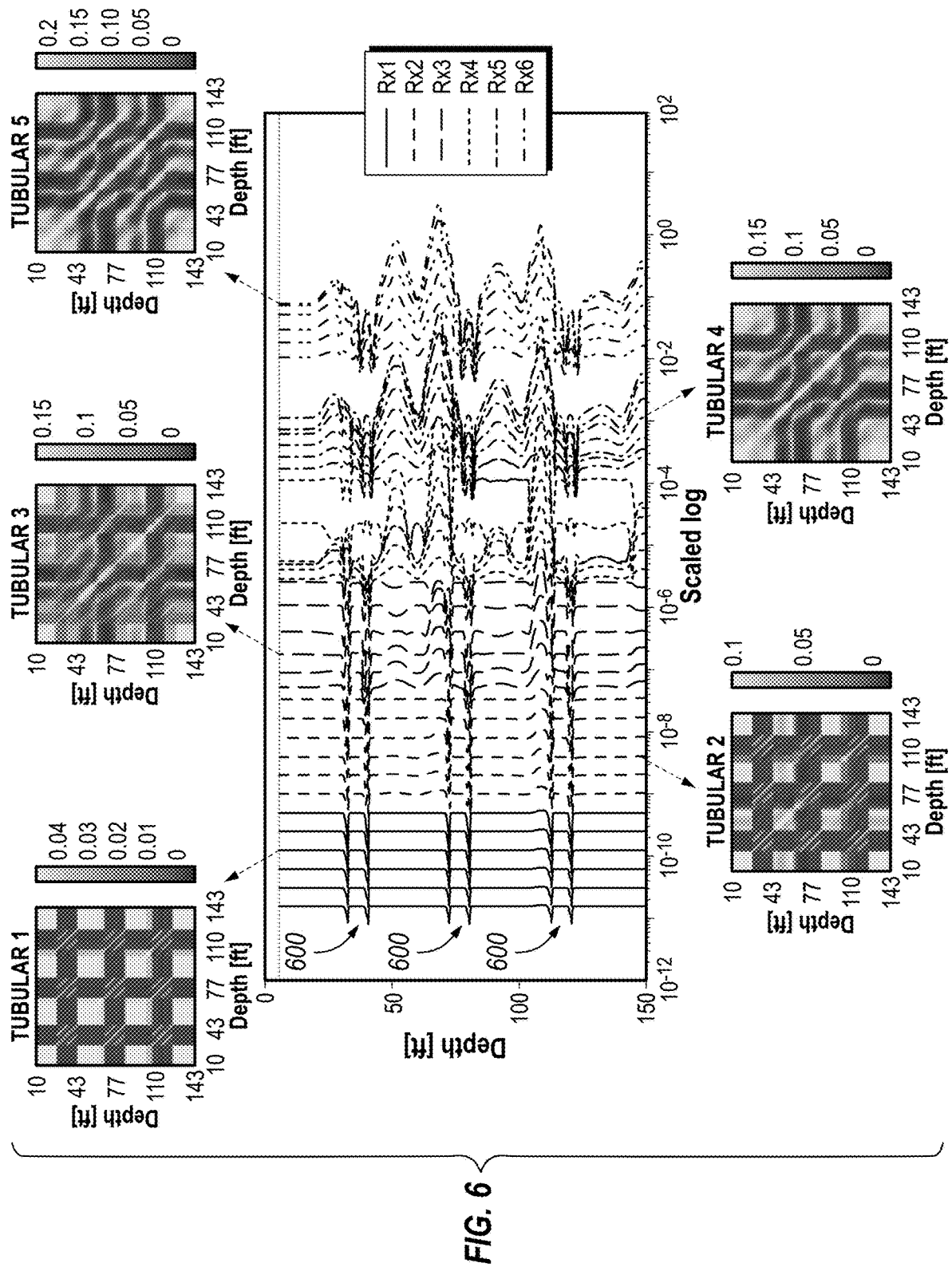
FIG. 6 illustrates graphs created using the workflow of FIG. 5 for the well plan in FIG. 4, that comprises five nested tubulars.
Figure 7:
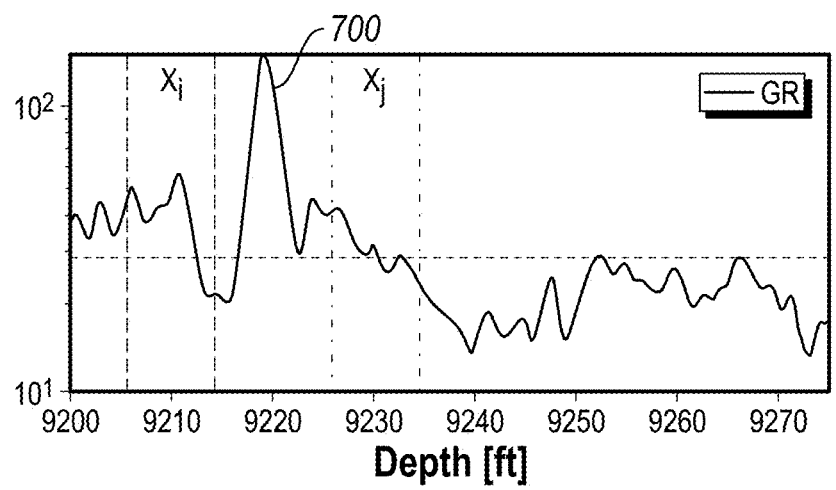
FIG. 7 illustrates a graph formed from the thickness determined in FIG. 6.
Figure 8:
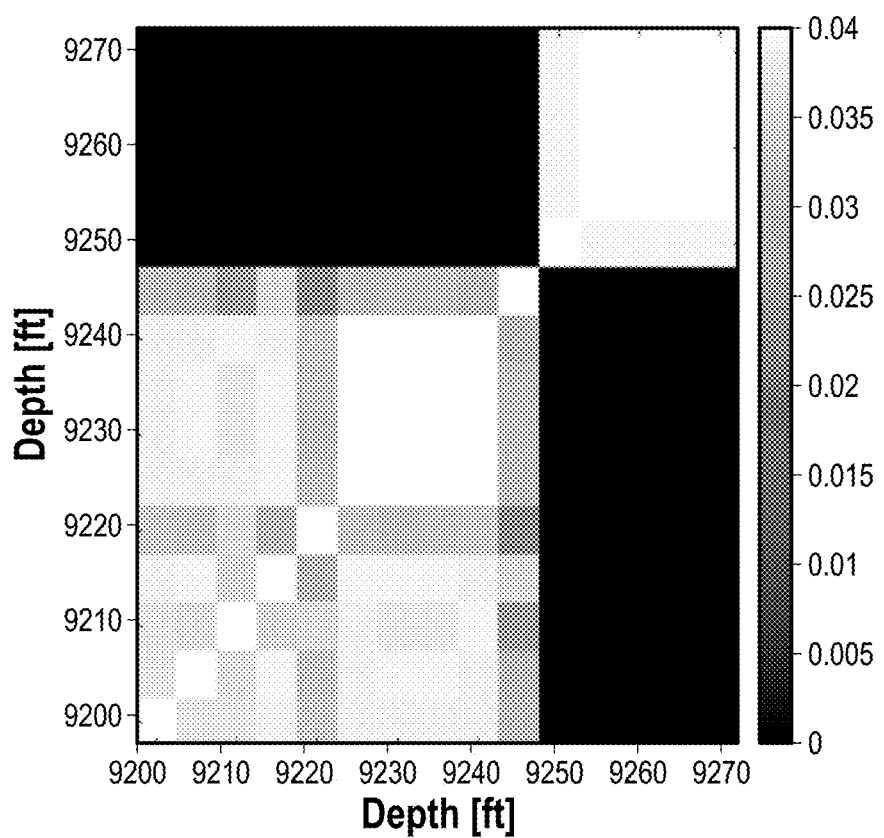
FIG. 8 is a correlation matrix of the measurements from FIG. 6.
Figure 9A:
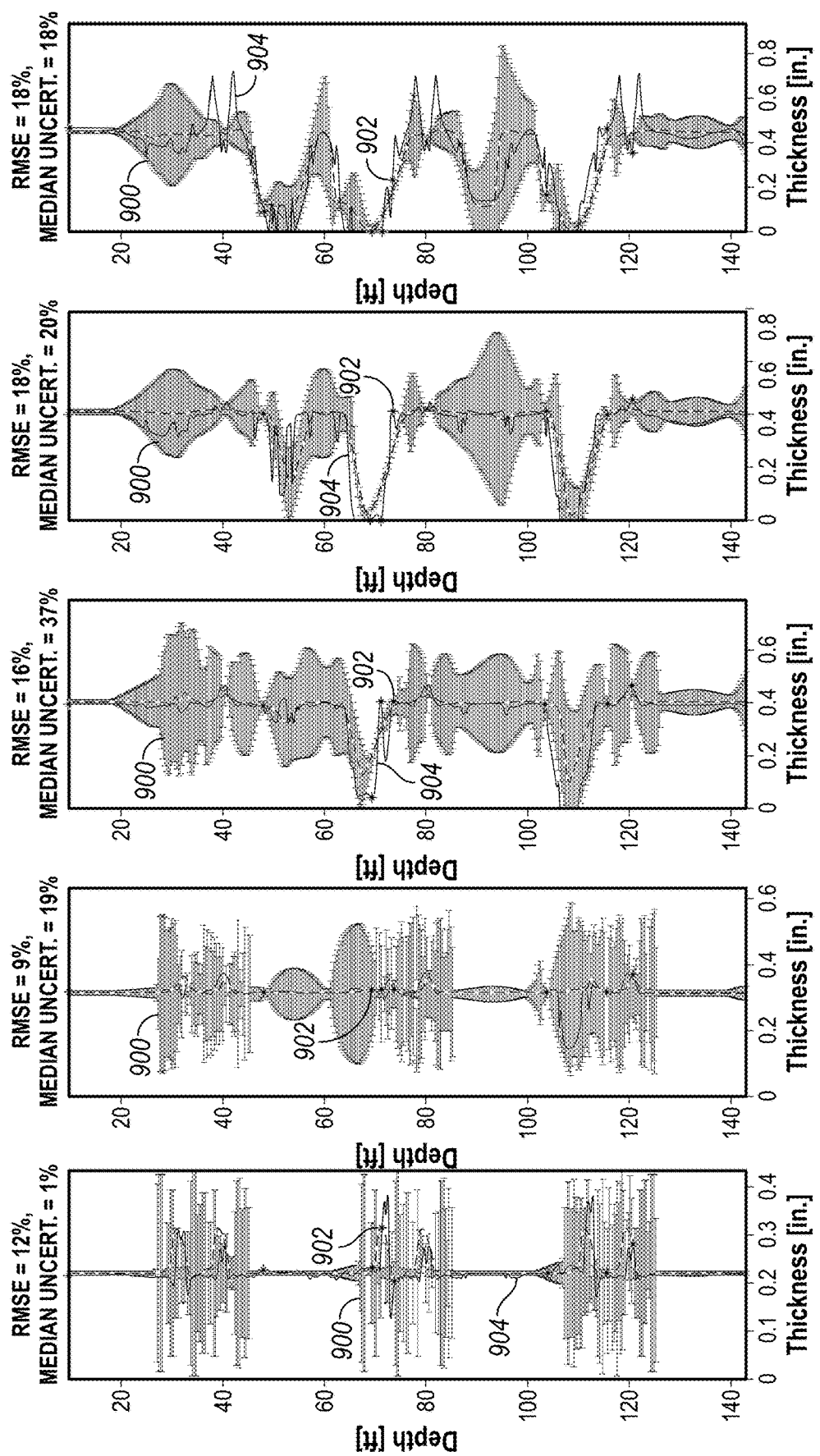
FIGS. 9A-9F are graphs showing posterior distributions of tubular from FIG. 6.
Figure 9B:
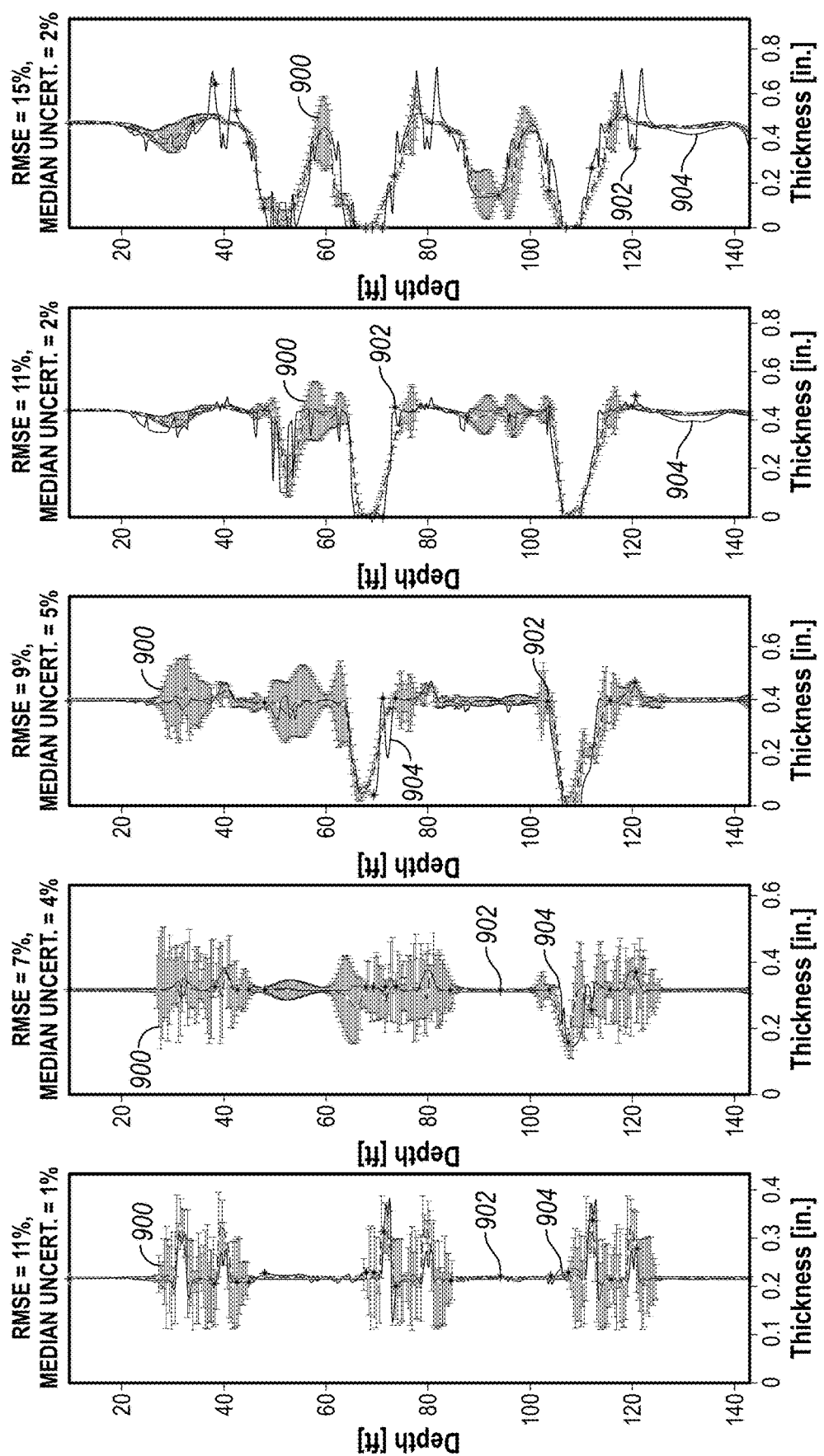
Figure 9C:
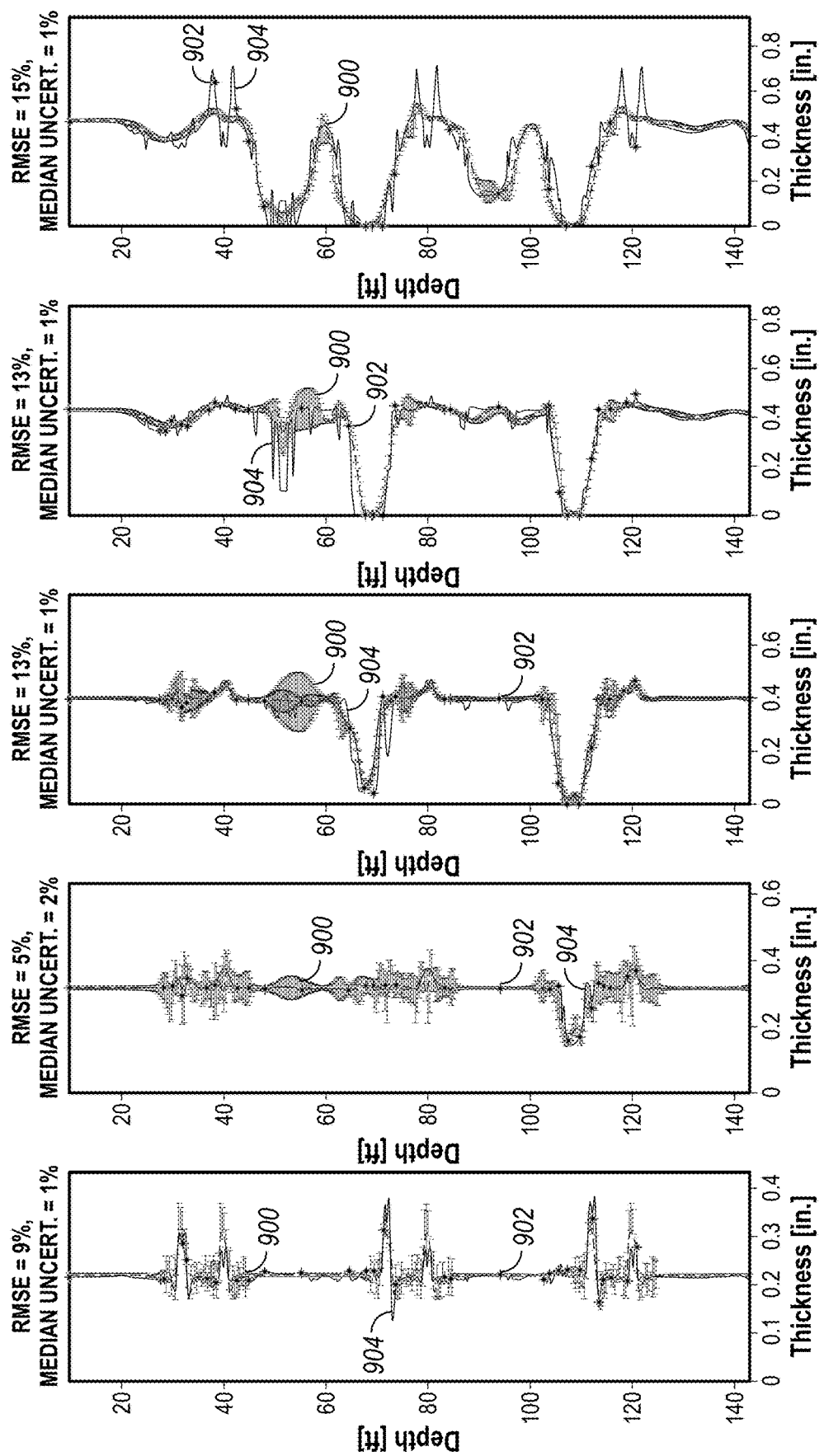
Figure 9D:
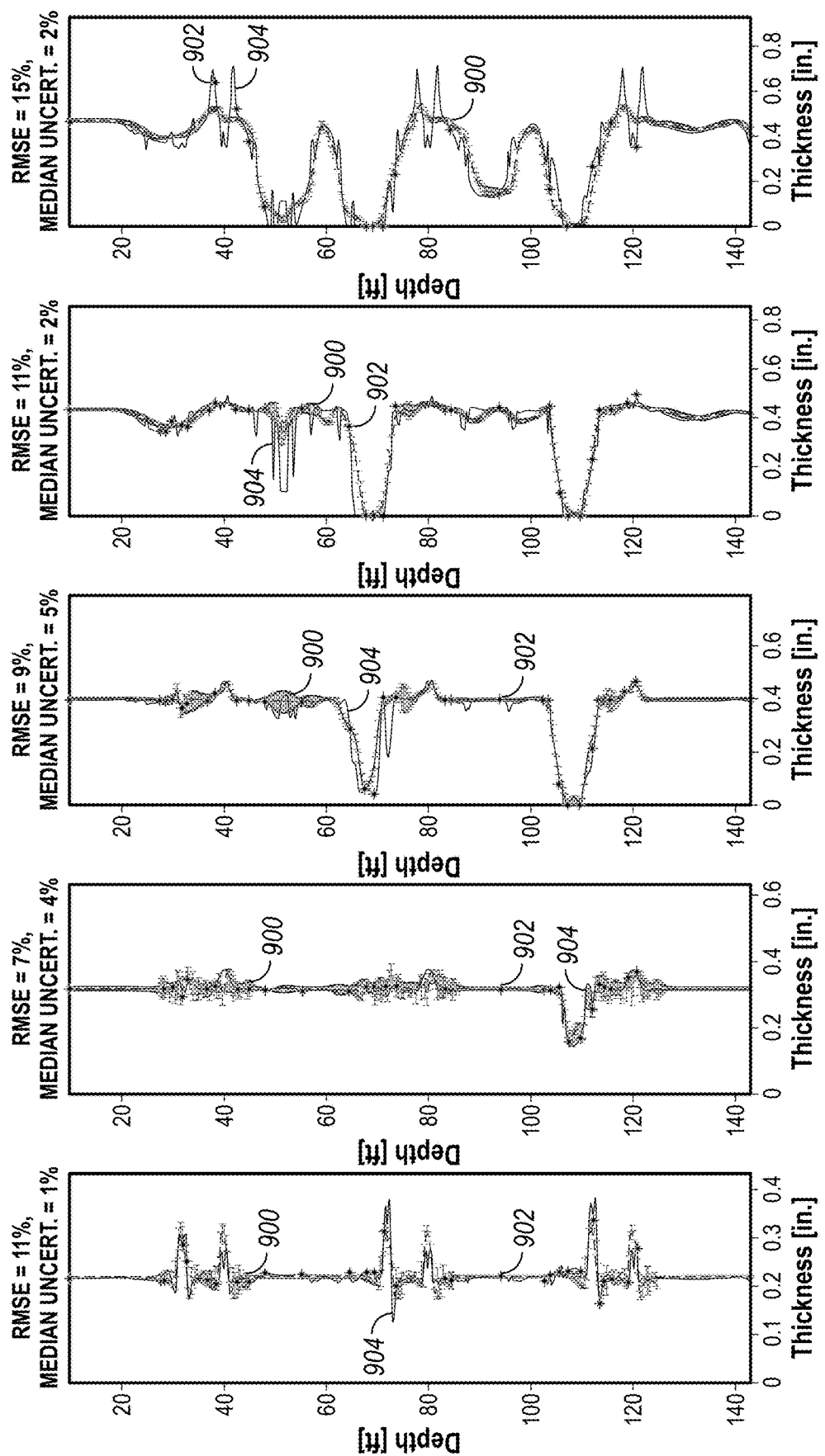
Figure 9E:
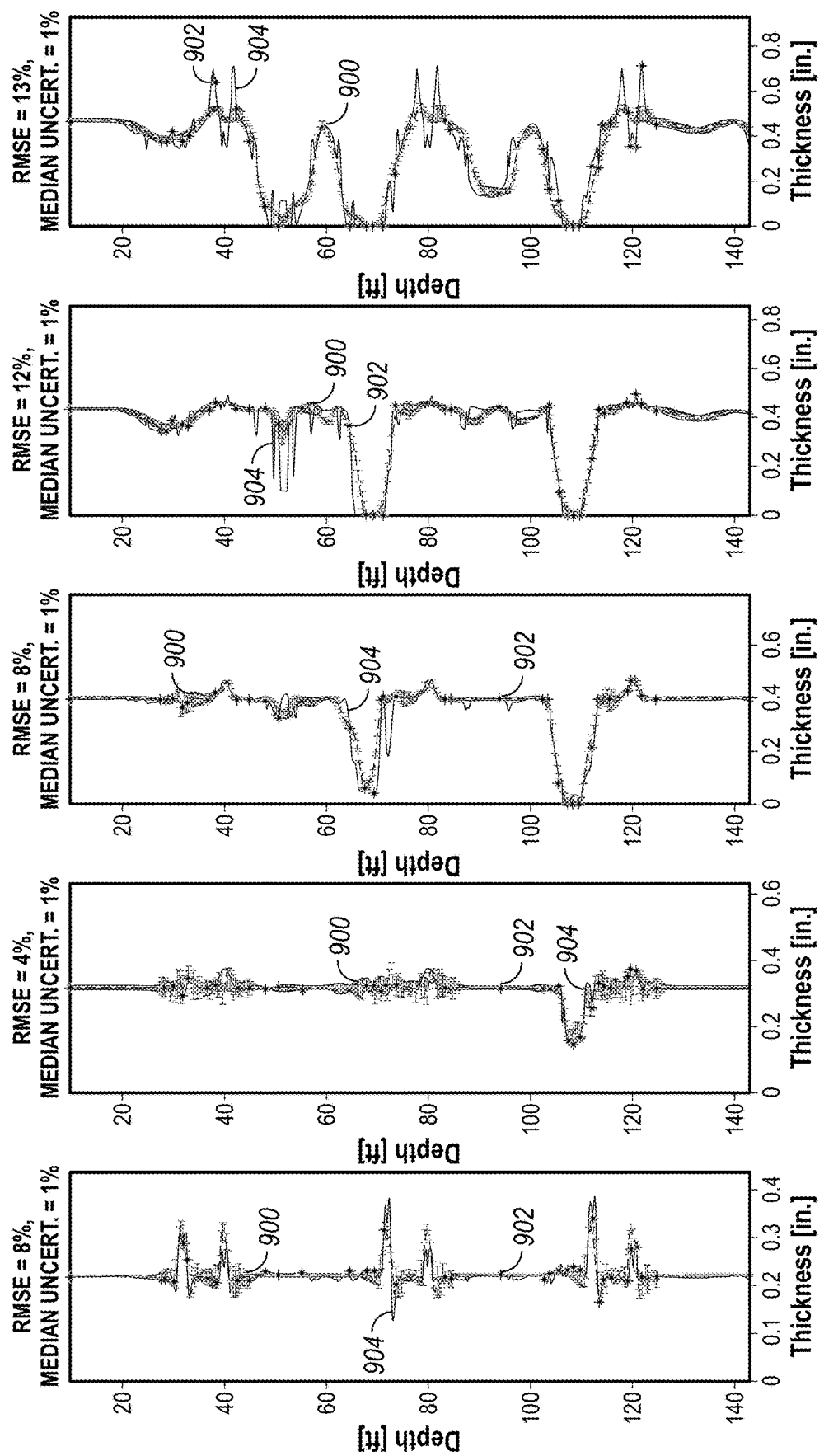
Figure 9F:
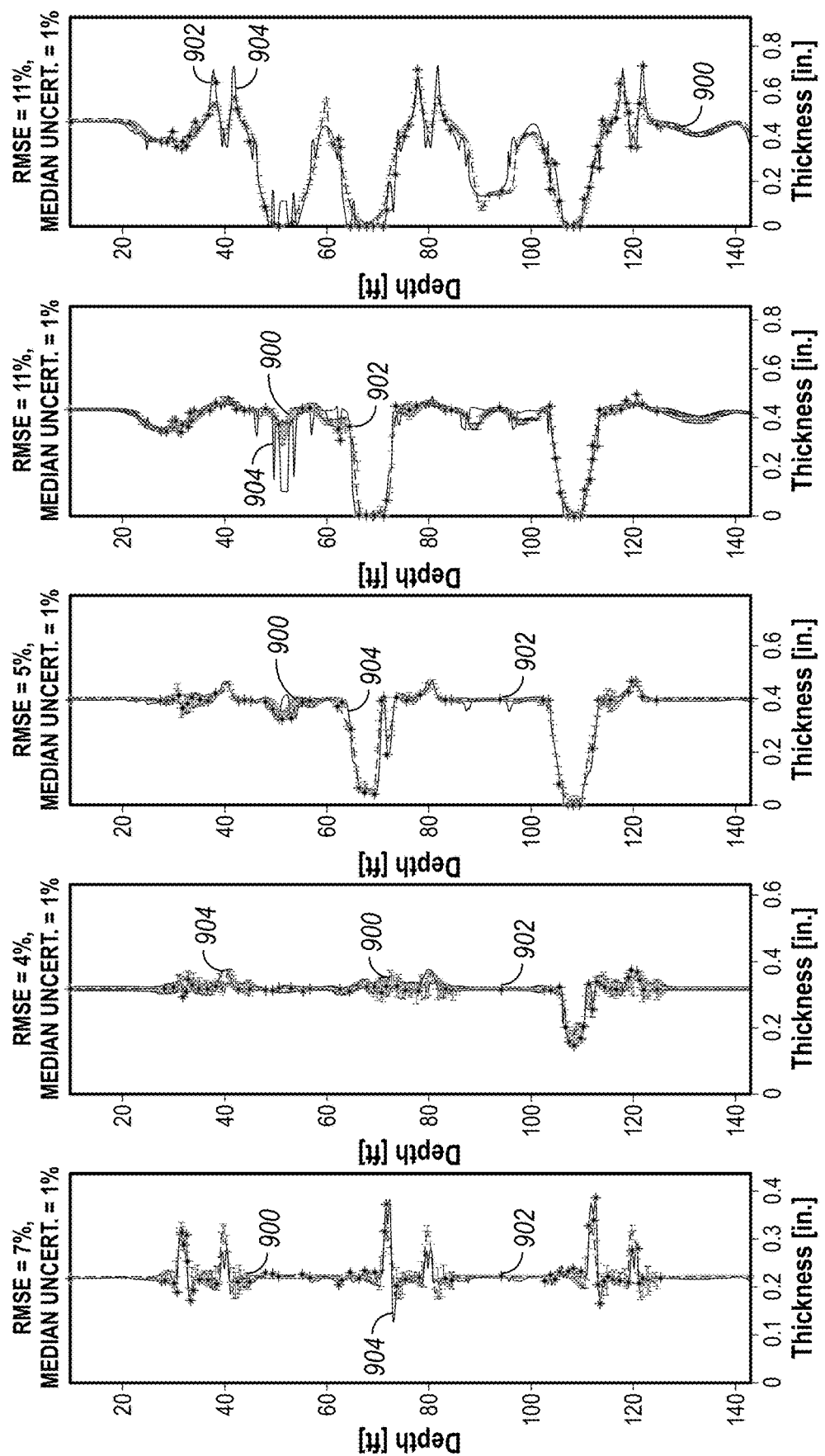

FIG. 6 illustrates graphs created using workflow 500 (e.g., referring to FIG. 5) for a well plan 400 (e.g., referring to FIG. 4), where well plan 400 comprises five nested tubulars. The raw data logs with different frequencies and receivers 104 (e.g., referring to FIG. 1) are shown in FIG. 6. The logs show artifacts 600, such as collars and defects on multiple tubulars, with the short-spacing receivers (Rx1-Rx3) being more sensitive to inner tubulars and long-spacing receivers (Rx4-Rx6) being more sensitive to outer tubulars. Raw data from receivers 1-5 (i.e., estimated pipe thickness logs) are used as proxies, or proxy logs, for computing the covariance matrices of the prior distributions of tubulars 1-5 as shown in FIG. 6. FIG. 7 is a representation of the measured data logs seen in FIG. 6, or a scaled version of it. It is a proxy of the thickness log to be estimated. As illustrated in the graph of FIG. 7, y is the mean value of that log and i, j are indices of depth points from the N depth points in the log. Additionally, FIG. 7 illustrates a representative curve 700 which represents possible measurements that may be taken EM logging tool 100 (e.g., referring to FIG. 1) and plotted in the graph of FIG. 7. Using the information from FIG. 7, a correlation matrix may be formed as illustrated in FIG. 8. The correlation matrix in FIG. 8 may be computed as follows:

$$\text{corr}_{ij} = \frac{\sum_{n=1}^{N}(x_{i,n}-\mu)(x_{j,n}-\mu)}{\sqrt{\sum_{n=1}^{N}(x_{i,n}-\mu)^2 \sum_{n=1}^{N}(x_{j,n}-\mu)^2}} \quad (15)$$

Additionally, the correlation matrix of FIG. 8 is scaled by the standard deviation of the tubular thicknesses. In this example a standard deviation equal to the nominal thickness is assumed around the nominal thickness of each tubular and may be found utilizing the following Equation:

$$\text{cov}_{i,j} = \text{corr}_{i,j} \times \sigma_i \times \sigma_j \quad (16)$$

FIG. 9A-9F shows the posterior distributions of each tubular, plotted in area 900 as MAP estimates and ±σ error bars, after each inversion batch. Points at which inversion was run are indicated by asterisks 902 and may be associated with low uncertainty equal to the inversion precision. Other points may be estimated from the posterior distribution which contains information about the correlation between estimated thickness at different points as captured by the covariance matrix in FIG. 8. For reference, a full resolution inversion log, had the inversion been run at all depth points, are shown by line 904 for comparison. The full resolution inversion log is an estimated thickness log that utilizes an inversion with all measurements taken by EM logging tool 100 (e.g., referring to FIG. 1).

The median percentage uncertainty defined as the median standard deviation as a percentage of the corresponding MAP estimate is shown in the header of the plot for each batch and may be used as a termination criterion (for example the algorithm terminates when the median (or maximum) uncertainty is below certain percentage, i.e., 10%, 5% or 1%). RMSE % denotes the root mean square difference in percentage between MAP estimates and the reference logs. It generally correlates well with the median uncertainty.

Figure 10:
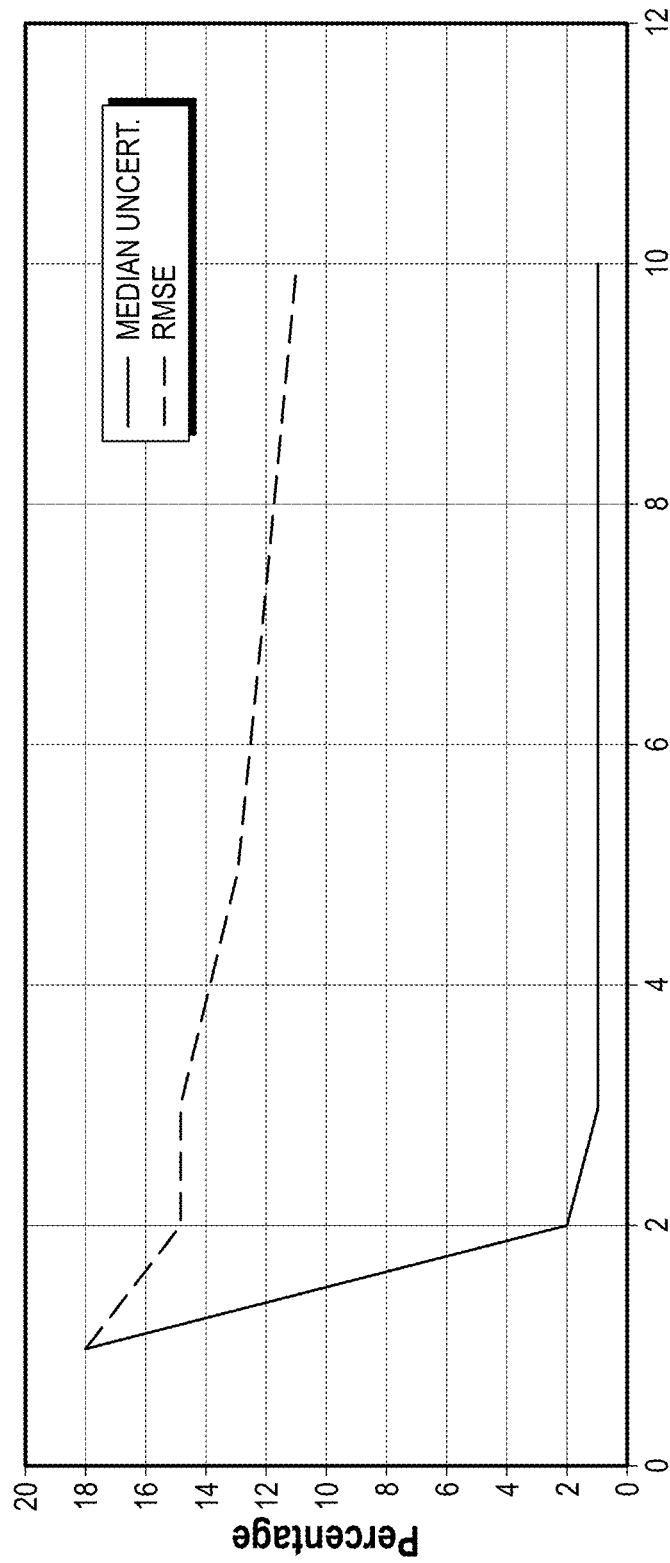
FIG. 10 illustrates a graph showing uncertainty based at least in part on the measurements from FIG. 6.

FIG. 10 shows the gradual drop in both uncertainty and error with processing more batches for the outermost tubular in well plan 400 (e.g., referring to FIG. 4). The diminishing return after five batches suggests that five batches may be sufficient to provide a representative inversion result with acceptable confidence. The same is true for other tubulars in well plan 400. With termination after five batches with eight points each, a downsampling factor of ten may be achieved. Another byproduct of the Bayesian approach for downsampling is a regularization effect observed on a tubular (e.g., referring to FIG. 6) at depth interval between 40-60 ft (12-18 meters) where the MAP response reconstructed after five batches shows a less choppy artifacts 600 on tubular four than the full resolution inversion log.

As an alternative metric for measuring the information gain from each acquisition, the differential entropy (DE) of the posterior distribution could be used as follows:

$$DE = E[-\log(p(t \,|\, \text{t\_inv} = \text{t\_inv}_{obs}))] \quad (17)$$

For a multivariate normal distribution, the DE is given as $$DE = \frac{1}{2}\ln\left\{(2\pi e)^N \left|\Sigma_{post.}\right|\right\} \quad (18)$$

where $\Sigma_{post.}$ is the covariance matrix of the posterior distribution. As sequential acquisitions are made, DE continues to decrease (since entropy is a measure of randomness of the random variable). The diminishing rate of decrease of DE can be used as a termination criterion.

In yet another embodiment, a regression algorithm such as partial least-squares regression may be used to reconstruct the estimated thickness at depth points that were not processed by inversion using a regression model trained using pairs of the inverted points and the corresponding data. Partial least-squares (PLS) regression is a technique used with data that contain correlated predictor variables (in this case the raw data curves are the correlated predictors). This technique constructs new predictor variables, known as components, as linear combinations of the original predictor variables. PLS constructs these components while considering the observed response values (these are the estimated thickness values at the inverted depth points).

In another embodiment, the output from each batch is displayed to personnel to monitor the progression of the inversion results with increasing the number of batches. The display will at first be a low-resolution version of the final result and the resolution may get refined as more batches are processed. A user may choose to manually terminate the process if no significant difference is observed between batches. Additionally, a user may also choose to terminate the process after a few batches and readjust the inversion parameters if intermediate results are not satisfactory.

Referring back to FIG. 5, workflow 500 may provide a data-driven approach to downsampling the time-extensive inversion process for multi-tubular inspection. With this capability, a user may obtain a representative estimate of the inversion result in much shorter time. The user does not have to worry about over-sampling (waste of valuable time) or under-sampling (insufficient data leads to ambiguity). Workflow 500 may further manage data inversion time, which may allow for meeting delivery times for delivers, especially in wells with workover rigs. Faster decisions on remedial actions to fix corroded or broken pipes may be made based on the methods disclosed herein.

Improvements from the methods and systems over current technology described above comprise a Bayesian workflow to prioritize inversion depth points in order to maximize the information gain from each point. The workflow uses raw data logs from different receivers as proxies to individual tubular thicknesses and compute prior distributions of the thicknesses. The prior distributions capture the correlation among different depth points of each pipe thickness through a covariance matrix. After each inversion batch, posterior distributions are computed and used to determine the depth points for the next inversion batch such that the expected information gain from that batch is maximized. The inversion results from each batch are used to construct intermediate individual thickness curves that are displayed to personnel along with the level of uncertainty. Stopping criteria are defined based on the level of uncertainty and/or the differential information gain.

Accordingly, this disclosure describes systems and methods which may relate to estimating one or more tubulars in a wellbore. The systems and methods may further be characterized by one of more of the following statements:

Statement 1: A method for estimating a thickness for each of a plurality of nested tubulars may comprise disposing an electromagnetic (EM) logging tool in a wellbore. The EM logging tool may comprise a transmitter disposed on the EM logging tool and a receiver disposed on the EM logging tool. The method may further comprise transmitting an electromagnetic field from the transmitter into one or more tubulars to energize the one or more tubulars with the electromagnetic field thereby producing an eddy current in the one or more tubulars, measuring the electromagnetic field generated by the eddy current in the one or more tubulars with the receiver on at least one channel to obtain a plurality of measurements, defining a prior distribution of individual thickness curves from at least one pipe thickness log based on the plurality of measurements, and/or processing a first set of depth point measurements to estimate one or more thicknesses of the one or more tubulars at one or more depths in the wellbore. The method may further comprise computing a posterior distribution of the at least one pipe thickness log based at least in part on the prior distribution and the one or more thicknesses and determining a second set of depth point measurements to process based on the posterior distribution.

Statement 2: The method of statement 1, wherein the plurality of measurements are in a time-domain or a frequency-domain.

Statement 3: The method of any previous statements 1 or 2, wherein the prior distribution of the at least one pipe thickness log is based at least in part on one or more proxy logs.

Statement 4: The method of any previous statements 1-3, wherein the prior distribution utilizes a non-linear inversion using a fast forward model to generate an individual thickness for each of the one or more tubulars.

Statement 5: The method of any previous statements 1-4, further comprising utilizing a covariance matrix to define the prior distribution of the at least one pipe thickness log.

Statement 6: The method of any previous statements 1-5, further comprising applying a Bayes' rule to compute the posterior distribution.

Statement 7: The method of any previous statements 1-6, further comprising selecting a first batch of K depth points and performing an inversion on the first batch of K depth points.

Statement 8: The method of any previous statements 1-7, wherein determining the second set of depth point measurements comprises determining a candidate depth point that has a variance in the posterior distribution that is largest.

Statement 9: The method of any previous statements 1-8, wherein determining the second set of depth point measurements comprises determining a candidate depth point that has a first principal component of a posterior covariance matrix that is a highest projection.

Statement 10: The method of any previous statements 1-7, wherein determining the second set of depth point measurements comprises determining a candidate depth point that results in a largest decrease in a differential entropy of the posterior distribution.

Statement 11: The method of any previous statements 1-10, wherein a level of uncertainty for the first set of depth point measurements and the second set of depth point measurements is computed and continuously updated.

Statement 12: The method of any previous statements 1-11, further comprising applying one or more stopping criteria to the second set of depth point measurements.

Statement 13: The method of any previous statements 1-12, further comprising reconstructing the at least one pipe thickness log at one or more depth points that are not in the first set of depth point measurements or the second set of depth point measurements using a regression model.

Statement 14: The method of statement 13, wherein the regression model is trained at least in part on the first set of depth point measurements and the second set of depth point measurements.

Statement 15: A system for estimating a thickness for each of a plurality of nested tubulars may comprise an electromagnetic (EM) logging tool. EM logging tool may comprise a transmitter disposed on the EM logging tool for transmitting an electromagnetic field from the transmitter into one or more tubulars to energize the one or more tubulars with the electromagnetic field thereby producing an eddy current in the one or more tubulars and a receiver disposed on the EM logging tool for measuring the electromagnetic field generated by the eddy current in the one or more tubulars with the receiver on at least one channel to obtain a plurality of measurements. The system may further comprise an information handling system communicatively connected to the EM logging. The information handling system may be configured to define a prior distribution of individual thickness curves from at least one pipe thickness log based on the plurality of measurements, process a first set of depth point measurements to estimate one or more thicknesses of the one or more tubulars at one or more depths in the wellbore, compute a posterior distribution of the at least one pipe thickness log based at least in part on the prior distribution and the one or more thicknesses, and determine a second set of depth point measurements to process based on the posterior distribution.

Statement 16: The system of statement 15, wherein the plurality of measurements are in a time-domain or a frequency-domain.

Statement 17: The system of any previous statements 15 or 16, wherein the prior distribution of the at least one pipe thickness log is based at least in part on one or more proxy logs.

Statement 18: The system of any previous statements 15-17, wherein the prior distribution utilizes a nonlinear inversion using a fast forward model to generate an individual thickness for each of the one or more tubulars.

Statement 19: The system of any previous statements 15-18, wherein the information handling system is further configured to utilize a covariance matrix to define the prior distribution of the at least one pipe thickness log.

Statement 20: The system of any previous statements 15-19, wherein the information handling system is further configured to apply Bayes' rule to compute the posterior distribution.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating a thickness for each of a plurality of nested tubulars comprising:
    disposing an electromagnetic (EM) logging tool in a wellbore, wherein the EM logging tool comprises:
        a transmitter disposed on the EM logging tool; and
        a receiver disposed on the EM logging tool;
    transmitting an electromagnetic field from the transmitter into one or more tubulars to energize the one or more tubulars with the electromagnetic field thereby producing an eddy current in the one or more tubulars;
    measuring the electromagnetic field generated by the eddy current in the one or more tubulars with the receiver on at least one channel to obtain a plurality of measurements;
    defining a prior distribution of individual thickness curves from at least one pipe thickness log based on the plurality of measurements;
    processing a first set of depth point measurements to estimate one or more thicknesses of the one or more tubulars at one or more depths in the wellbore;
    computing a posterior distribution of the at least one pipe thickness log based at least in part on the prior distribution and the one or more thicknesses; and
    determining a second set of depth point measurements to process based on the posterior distribution.

2. The method of claim 1, wherein the plurality of measurements are in a time-domain or a frequency-domain.

3. The method of claim 1, wherein the prior distribution of the at least one pipe thickness log is based at least in part on one or more proxy logs.

4. The method of claim 1, wherein the prior distribution utilizes a non-linear inversion using a fast forward model to generate an individual thickness for each of the one or more tubulars.

5. The method of claim 1, further comprising utilizing a covariance matrix to define the prior distribution of the at least one pipe thickness log.

6. The method of claim 1, further comprising applying a Bayes' rule to compute the posterior distribution.

7. The method of claim 1, further comprising selecting a first batch of K depth points from the plurality of measurements and performing an inversion on the first batch of K depth points.

8. The method of claim 1, wherein determining the second set of depth point measurements comprises determining a candidate depth point that has a variance in the posterior distribution that is largest.

9. The method of claim 1, wherein determining the second set of depth point measurements comprises determining a candidate depth point that has a first principal component of a posterior covariance matrix that is a highest projection.

10. The method of claim 1, wherein determining the second set of depth point measurements comprises determining a candidate depth point that results in a largest decrease in a differential entropy of the posterior distribution.

11. The method of claim 1, wherein a level of uncertainty for the first set of depth point measurements and the second set of depth point measurements is computed and continuously updated.

12. The method of claim 1, further comprising applying one or more stopping criteria to the second set of depth point measurements.

13. The method of claim 1, further comprising reconstructing the at least one pipe thickness log at one or more depth points that are not in the first set of depth point measurements or the second set of depth point measurements using a regression model.

14. The method of claim 13, wherein the regression model is trained at least in part on the first set of depth point measurements and the second set of depth point measurements.

15. A system for estimating a thickness for each of a plurality of nested tubulars comprising:
- an electromagnetic (EM) logging tool comprising:
  - a transmitter disposed on the EM logging tool for transmitting an electromagnetic field from the transmitter into one or more tubulars to energize the one or more tubulars with the electromagnetic field thereby producing an eddy current in the one or more tubulars; and
  - a receiver disposed on the EM logging tool for measuring the electromagnetic field generated by the eddy current in the one or more tubulars with the receiver on at least one channel to obtain a plurality of measurements; and
- an information handling system communicatively connected to the EM logging to and configured to:
  - define a prior distribution of individual thickness curves from at least one pipe thickness log based on the plurality of measurements;
  - process a first set of depth point measurements to estimate one or more thicknesses of the one or more tubulars at one or more depths in the wellbore;
  - compute a posterior distribution of the at least one pipe thickness log based at least in part on the prior distribution and the one or more thicknesses; and
  - determine a second set of depth point measurements to process based on the posterior distribution.

16. The system of claim 15, wherein the plurality of measurements are in a time-domain or a frequency-domain.

17. The system of claim 15, wherein the prior distribution of the at least one pipe thickness log is based at least in part on one or more proxy logs.

18. The system of claim 15, wherein the prior distribution utilizes a non-linear inversion using a fast forward model to generate an individual thickness for each of the one or more tubulars.

19. The system of claim 15, wherein the information handling system is further configured to utilize a covariance matrix to define the prior distribution of the at least one pipe thickness log.

20. The system of claim 15, wherein the information handling system is further configured to apply Bayes' rule to compute the posterior distribution.

* * * * *